Jan. 29, 1963

F. E. LONG 3,075,868

METHOD OF BONDING POLYMER PLASTICS TO SUBSTRATE
WEBS OF DISSIMILAR MATERIALS

Filed Sept. 9, 1957

INVENTOR
FLORREN E. LONG

BY Mason, Porter, Diller & Stewart,

ATTORNEYS

Jan. 29, 1963  F. E. LONG  3,075,868
METHOD OF BONDING POLYMER PLASTICS TO SUBSTRATE
WEBS OF DISSIMILAR MATERIALS
Filed Sept. 9, 1957
2 Sheets-Sheet 2

INVENTOR
FLORREN E. LONG

BY Mason, Porter, Diller & Stewart,
ATTORNEYS

United States Patent Office 3,075,868
Patented Jan. 29, 1963

3,075,868
METHOD OF BONDING POLYMER PLASTICS TO SUBSTRATE WEBS OF DISSIMILAR MATERIALS
Florren E. Long, Fredericktown, Ohio, assignor to Continental Can Company, Inc., New York, N.Y., a corporation of New York
Filed Sept. 9, 1957, Ser. No. 682,756
7 Claims. (Cl. 156—82)

This invention relates to the art of preparing laminated structures from materials which can be extruded and which are subject to activation upon heating.

It has been a practice to extrude heated polymers such as polyethylene, polystyrene and like plastic substances, for producing films, sheets, rods, tubing and other monolayer forms thereof. Such structures are inert to adhesion when cooled, and have limited physical and chemical receptivity to bonding to one another and to dissimilar materials such as metal foil, polyester and cellophane films, and the like. Hence, it has been a practice in preparing laminated structures from such extrudable polymers to prepare the metal foil or other dissimilar film as a substrate web, then extrude the heated polymer at high temperature directly onto the substrate, and immediately combine the substrate and polymer coating by pressure; but this has frequently resulted in weak and variable bonding. For example, when polyethylene film is extruded at a temperature of 400 to 500 degrees F., temperature bonds can be produced with a strength of 300 to 500 grams by the usual test.

Another practice was to apply an adhesive solution to the polymer surface to be laminated, remove the solvent, and then bring the coated surface to the substrate web and effect the combination by pressure with or without heat.

When it is sought to effect a stronger bonding by heating the polymer to adherent condition prior to contact with the substrate or by maintaining it hot, the polymer becomes or is so soft that it loses its regularity of thickness and condition, and the laminated product is subject to irregularities in thickness and appearance, along with uncertainties of adhesion at places where deformation of the heated polymer causes it to move from the heating means.

According to the present invention, the surface portion of the polymer which is to be bonded to the substrate is activated by heating whereas the rest of the polymer is maintained against change of size and other deformations by cooling its opposite surface concurrently with such heating, and the bonding is effected while such opposite surface is being maintained cooler. Therewith bond strengths of over 1000 grams can be uniformly produced, and the non-treated surface remains in a condition for the usual heat-sealing in closing a package.

In one embodiment of the invention, the cooling roll itself can be employed as a pressure means for effecting the bonding of the bodies to be laminated.

The invention is also applicable to the bonding together of two films of the polymer material, wherewith the surfaces thereof which are to be joined are both heated preparatory to the bonding, while the two external surfaces are maintained cool.

The invention is further applicable to the bonding of a polymer film, immediately following its extrusion, to a substrate, where the polymer film at the temperature of extrusion has insufficient surface activity for proper bonding.

Illustrative practices of the invention are shown on the accompanying drawings, in which.

Figure 1:
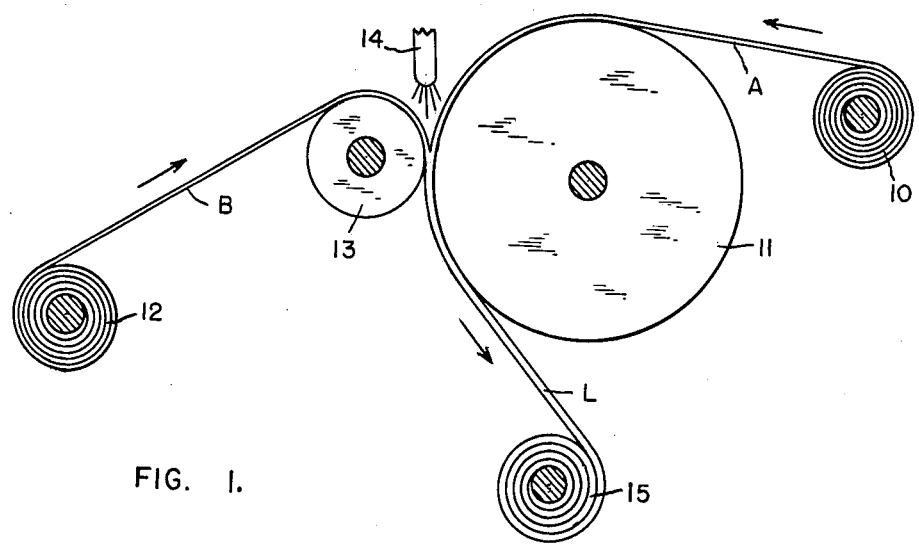
FIG. 1 is a conventionalized diagram of apparatus for bonding a preformed film of polymer plastic to a substrate web of dissimilar material.

In the practice according to FIG. 1, a supply roll 10 of polymer plastic such as polyethylene or polystyrene delivers its film A to the surface of a driven cooling roller 11. A supply roll 12 of substrate web B, such as metal foil, polyester or cellophane, delivers the web to the surface of a driven pressure roller 13. The film and web pass together between the rollers 11, 13 and are compressed thereby. An activating device 14 is provided opposite the nip of these rollers where the film and web enter. Concurrently the opposite surface of the film is cooled by its contact with the cooling roller 11, so that this film is protected against heating throughout its thickness and hence against changes of thickness and against surface change, noting that the pulling of the film from the supply roll 10 in the illustrative example is accomplished by the engaging of this cooled surface of the film with an extensive part of the periphery of the cooling roller 11, including portions both in front of and behind the portion which is then being heated at its exposed surface remote from the cooling roller 11. Further, the passage of the laminated structure between the rollers removes the film and web from the heated region, and the structure L is cooled by the continued contact with the cooling roller and its passage therefrom to a winding reel 15 upon which the laminated stock is wound.

The activation of the polymer film is a surface condition, and essentially the entire body of the film may be maintained cold.

The activating device 14 is effective to deliver heated air, flame or radiant heat against the adjacent surface of the film immediately prior to the passage of this surface into contact with the substrate web and thereby raise the exposed surface to a temperature at which it has become heat-activated and thus adhesive.

Figure 2:
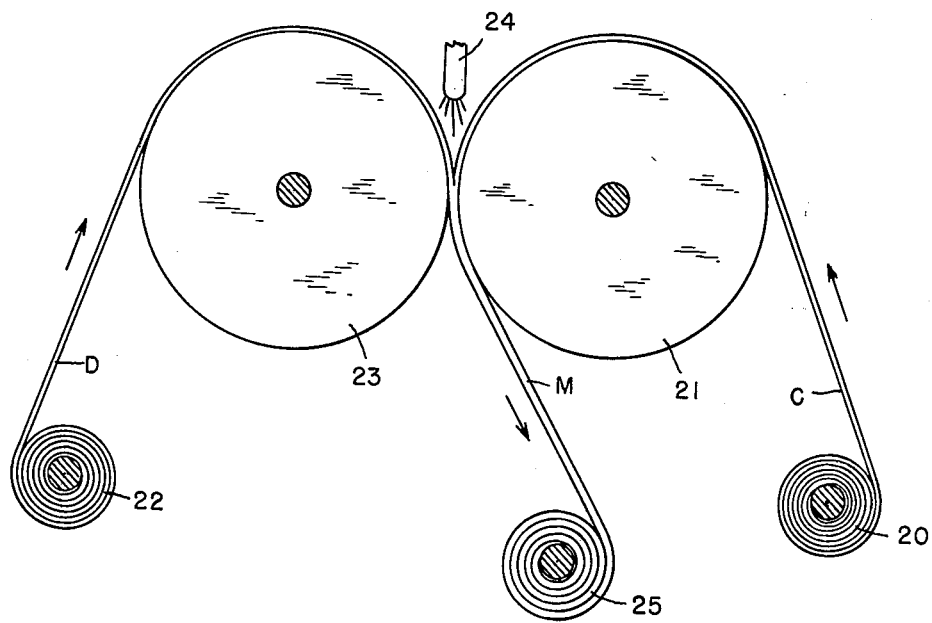
FIG. 2 is a like diagram showing the bonding of two preformed films of polymer plastic.

In FIG. 2, a supply roll 20 delivers a first polymer film C to the surface of a driven cooling roller 21; and a second supply roll 22 delivers a second polymer film D to the surface of a second driven cooling roller 23. The activating device 24, as before, is positioned opposite the nip of rollers 21, 23 and is effective to activate the surfaces of both films immediately before they enter the nip of the rollers, so that these surfaces become adhesive to one another, are then compressed into bonded relation between the rollers, and thence move to and are taken up as a laminated structure M on the winding reel 25. In this illustrative form, as with FIG. 1, the cooling rollers act to draw the film stock from the supply rolls, to maintain the bodies of the films cool and against change of condition, and to cool the laminated stock before its winding up.

Figure 3:
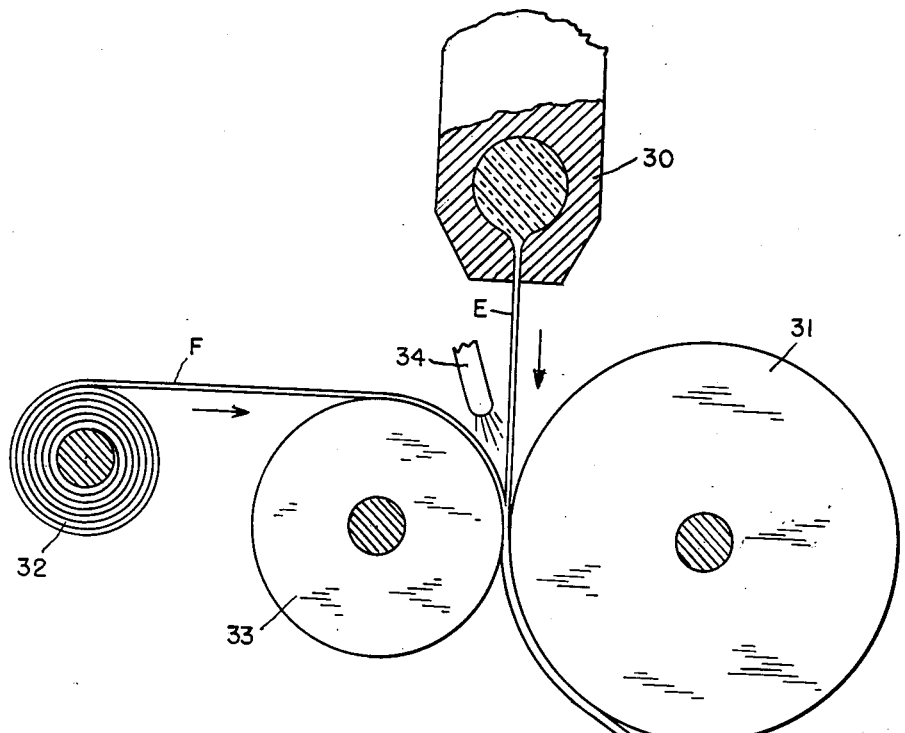
FIG. 3 is a like diagram showing the treatment of a polymer film, immediately following its formation by extrusion, for activating a surface thereof, and its bonding to a substrate web of dissimilar material.

In the form of FIG. 3, an extruder die 30 delivers a polymer film E to the surface of the driven cooling roller 31. A supply roll 32 delivers a web F of a dissimilar substrate such as metal foil, polyester, cellophane, to the driven pressure roller 33. An activating device 34 is positioned opposite the nip of the rollers 31, 33 and is effective to activate the adjacent surface of the extruded polymer surface immediately before the same comes into contact with the substrate web, and the joined film and web then are compressed between the rollers 31, 33 and are taken up as a laminated structure N on the winding reel 35. In this form, the extruded film need not be brought into contact with the cooling roller 31 before it enters the nip, noting that the advancement of the extruded film to the cooling roller can be accomplished by the extruding action itself and mounting the extruding device 30 above the nip.

In each case, the activating device 14, 24, or 34, can also act to heat both materials, noting that such heating action by the device 14 and 34 upon the dissimilar substrate web avoids a rapid chilling of the activated surface of the film upon contact with the substrate web. The activation can be effected for example by a direct flame acting on the surface of the film, so that a temperature of about 1500 degrees F. is employed and apparently a surface oxidation effect is produced by oxygen present, and the treated surface has been activated for attaining the stronger bonding without heating or transformation at the opposite surface. As set out above, other means such as heated air or radiant heat can be utilized to activate the surface which is to be bonded.

The bond of the polymer film to the substrate or to a second polymer film is by physical-chemical effect, and is accomplished without reducing the surface to a fluid condition.

The word "polymer" is herein employed as inclusive of sheets and other articles of polyethylene, polystyrene, and like extrudable and heat-activatable polymers. The phrase "substrate web" is inclusive of sheets and other articles of metal, polyester, and cellophane which are not susceptible or extrusion in the condition present at the lamination region and at temperatures tolerable to the polymer film. The phrase "heat activation" is used herein to define the change of character of a surface portion of a polymer by which it becomes adhesive and capable of bonding to a like material or to a substrate of dissimilar material.

It will be understood that the illustrative examples are not restrictive, and that the invention may be practiced in many ways within the scope of the appended claims.

What is claimed is:

1. The method of laminating a heat-activatable polymer material, which comprises the steps of heating a surface of a sheet selected from the group consisting of polyethylene and polystyrene in the presence of air by exposure at a temperature of about 1500 degrees F. and thereby activating said surface of said sheet by superficial oxidation prior to softening of the sheet throughout its thickness, immediately bringing the hot and activated surface of said sheet into direct contact with a substrate web to be laminated therewith, pressing the heat activated sheet directly against said substrate web while the surface of said sheet is in said heated and activated condition, and maintaining other parts of the thickness of said sheet cool throughout the activation, contact and pressing steps.

2. The method of laminating a heat-activatable extrudable material selected from the group consisting of polyethylene and polystyrene, which comprises heating and extruding a mass of the said material whereby to form a film having a temperature below that of substantial heat activation thereof, contacting a surface of the extruded film with a surface of a lamination substrate of metal foil, heating the adjacent surfaces of said extruded film and said substrate immediately before said surfaces are brought into contact by a gas flame at a temperature of about 1500 degrees F. in the presence of oxygen whereby to activate the said surface of the extruded film by superficial oxidation, maintaining the opposite surface of the extruded film cool during the activation, pressing the film and substrate directly together while the said surface of the extruded film is so heated, and cooling the opposite surface of the extruded film throughout the contacting and pressing.

3. The method of laminating a heat-activatable polymer material, which comprises the steps of heating the adjacent surfaces of two sheets, each sheet being of material selected from the group consisting of polyethylene and polystyrene, in the presence of air by a gas flame at a temperature of about 1500 degrees F. and thereby activating said surfaces of said sheets by superficial oxidation, immediately bringing the hot and activated surfaces of said sheets into direct contact with one another, pressing the heat activated sheets together while the surfaces of said sheets are in said heated and activated condition, and maintaining other parts of the thicknesses of said sheets cool throughout the activation, contact and pressing steps.

4. The method of claim 3 in which one of said sheets is of polyethylene and the other said sheet is of polystyrene.

5. The method of laminating a heat-activatable polymer material, which comprises the steps of heating the adjacent surfaces of two sheets, one of said sheets being of polyethylene and the other sheet being of a polyester material, in the presence of air by a gas flame at a temperature of about 1500 degrees F. and thereby activating said surface of said polyethylene sheet by superficial oxidation, immediately bringing the hot and activated surface of said polyethylene sheet into direct contact with said adjacent surface of the other said sheet, pressing the sheets together while the surface of said polyethylene sheet is in said heated and activated condition, and maintaining other parts of the thickness of said polyethylene sheet cool throughout the activation, contact and pressing steps.

6. The method of laminating a heat-activatable polymer material, which comprises the steps of heating the adjacent surfaces of two sheets, one of said sheets being of polyethylene and the other said sheet being a metal foil, in the presence of air by a gas flame at a temperature of about 1500 degrees F. and thereby activating said surface of said polyethylene sheet by superficial oxidation, immediately bringing the hot and activated surface of said polyethylene sheet into direct contact with said adjacent surface of the metal foil, pressing the sheets together while the surface of said polyethylene sheet is in said heated and activated condition, and maintaining other parts of the thickness of said polyethylene sheet cool throughout the activation, contact and pressing steps.

7. The method of laminating a heat-activatable polymer material which comprises the steps of heating the adjacent surfaces of two sheets, one of said sheets being of polyethylene and the other sheet being of cellophane, in the presence of air by a gas flame at a temperature of about 1500 degrees F. and thereby activating said surface of said polyethylene sheet by superficial oxidation, immediately bringing the hot and activated surface of said polyethylene sheet into direct contact with said adjacent surface of the other said sheet, pressing the sheets together while the surface of said polyethylene sheet is in said heated and activated condition, and maintaining other parts of the thickness of said polyethylene sheet cool throughout the activation, contact and pressing steps.

References Cited in the file of this patent

UNITED STATES PATENTS

| | | |
|---|---|---|
| 1,519,239 | Clay | Dec. 16, 1924 |
| 2,434,541 | Bierer | Jan. 13, 1948 |
| 2,488,212 | Lloyd | Nov. 15, 1949 |
| 2,582,294 | Stober | Jan. 15, 1952 |
| 2,632,921 | Kreidl | Mar. 31, 1953 |
| 2,648,097 | Kritchever | Aug. 11, 1953 |
| 2,676,642 | Bergstein et al. | Apr. 27, 1954 |
| 2,683,894 | Kritchever | July 20, 1954 |
| 2,691,208 | Brennan | Oct. 12, 1954 |
| 2,697,058 | Lasak | Dec. 14, 1954 |
| 2,714,571 | Irion et al. | Aug. 2, 1955 |
| 2,715,075 | Wolinski | Aug. 9, 1955 |
| 2,715,363 | Hoover | Aug. 16, 1955 |
| 2,716,074 | Mick et al. | Aug. 23, 1955 |
| 2,795,820 | Grow | June 18, 1957 |
| 2,861,022 | Lundsager | Nov. 18, 1958 |